(12) United States Patent
Duong et al.

(10) Patent No.: US 12,387,364 B2
(45) Date of Patent: Aug. 12, 2025

(54) METHODS AND APPARATUS OF BRAIN-LIKE IN-PIXEL INTELLIGENT PROCESSING SYSTEM

(71) Applicant: ADAPTIVE COMPUTATION LLC, La Verne, CA (US)

(72) Inventors: Tuan A Duong, La Verne, CA (US); Quangdao Duong, La Verne, CA (US)

(73) Assignee: ADAPTIVE COMPUTATION LLC., La Verne, CA (US)

( * ) Notice: Subject to any disclaimer, the term of this patent is extended or adjusted under 35 U.S.C. 154(b) by 346 days.

(21) Appl. No.: 18/205,643

(22) Filed: Jun. 5, 2023

(65) Prior Publication Data

US 2024/0404096 A1    Dec. 5, 2024

(51) Int. Cl.
*G06T 7/70* (2017.01)
*G06V 10/25* (2022.01)
*G06V 10/44* (2022.01)
*G06V 10/82* (2022.01)

(52) U.S. Cl.
CPC .............. *G06T 7/70* (2017.01); *G06V 10/25* (2022.01); *G06V 10/44* (2022.01); *G06V 10/82* (2022.01); *G06V 2201/07* (2022.01)

(58) Field of Classification Search
CPC .......... G06T 7/70; G06V 10/25; G06V 10/44; G06V 10/82; G06V 2201/07; G06V 10/764; G06V 10/454

USPC ......................................................... 382/103
See application file for complete search history.

(56) References Cited

FOREIGN PATENT DOCUMENTS

CA         2944908 C  *  6/2020  ........... G06F 1/3206

* cited by examiner

*Primary Examiner* — Charlotte M Baker
(74) *Attorney, Agent, or Firm* — Ming Jiang; MM IP SERVICES LLC

(57) ABSTRACT

Aspects of present disclosure relates to a brain-like in-pixel intelligent processing system having an in-pixel processing array, a feature vector generator, a neural network processor, and a region and object of interest identifier. In-pixel processing array includes N×M in-pixel processing units. Each in-pixel processing unit includes photogate sensor to acquire image, average circuit to generate P element, subtraction circuit to generate F element, and absolute circuit to generate LGN element. Feature vector generator generates P, F, and LGN feature vectors of in-pixel processing array. Neural network processor processes P, F, and LGN feature vectors and detects object, recognizes object, and determines location of object. Region and object of interest identifier identifies region and object of interest from object, and provides feedback of identified region and object of interest and processed P, F, and LGN feature vectors to the in-pixel processing array to improve the object detection and identification.

20 Claims, 9 Drawing Sheets

|P(1,1)|P(1,2)|P(1,3)|...|P(1,M)|
|---|---|---|---|---|
|P(2,1)|P(2,2)|P(2,3)| |P(2,M)|
|P(3,1)|P(3,2)|P(3,3)| |P(3,M)|
|P(N,1)| | | |P(N,M)|

FIG. 2

METHODS AND APPARATUS OF BRAIN-LIKE IN-PIXEL INTELLIGENT PROCESSING SYSTEM

STATEMENT REGARDING FEDERALLY SPONSORED RESEARCH OR DEVELOPMENT

This invention was made with Government support under Agreement No. HR00112190117, awarded by DARPA. The Government has certain rights in the invention.

FIELD

The present disclosure generally relates to image acquisition and processing, and more particularly to an in-pixel processing array for image acquisition and processing, object detection, classification and tracking in a brain-like in-pixel intelligent processing system built on a semiconductor chip and methods of using the brain-like in-pixel intelligent processing system.

BACKGROUND

Since full color image looks very satisfied via our visual systems, however, there are overwhelmed data for a computer system to digest and the immediate price to pay more computation to process and more power to burn for object detection, classification and tracking; hence it may pose its difficulties for edge, mobile tasks.

On the other hand, researches have shown that human visual systems are versatile and flexible, capable of identifying objects in a dynamic real-world environment. Rapid and accurate object recognition is achieved even though parts of the human visual system (e.g., eyes) may be fatigued, humans are unable to process detailed information at high speeds, there is limited object information to process, and/or the inability to memorize large amount of information at any given time. Saccadic eye movement is one of the bio-inspired visual models that may be emulated to extract features from captured image data based on a biological visual pathway, such as by emulating a periphery, a fovea, and a lateral *geniculate* nucleus of a vertebrate. The processing requirement is in the pixel level; hence it is necessary to develop a brain-like in-pixel intelligent processing system to achieve rapid and accurate object recognition by humans.

Therefore, heretofore unaddressed needs still exist in the art to address the aforementioned deficiencies and inadequacies.

SUMMARY

In one aspect, the present disclosure relates to an in-pixel processing array for a brain-like in-pixel intelligent processing system. In certain embodiments, the in-pixel processing array includes an array of in-pixel processing units having N columns and M rows of in-pixel processing units, where N and M are positive integer. The in-pixel processing array forms an image acquisition and bio-inspired processing imager configured to processes raw gray information in a pixel level. In certain embodiments, each of the in-pixel processing units includes: a photogate sensor, an average circuit, a subtraction circuit, and an absolute circuit. The photogate sensor captures a pixel of an image of an object and produces an $I_{out}$ current to the in-pixel processing array from the in-pixel processing unit. The average circuit receives and averages Iout current from the in-pixel processing unit and a group of neighboring in-pixel processing units through a set of input channels, and the averaged $I_{out}$ current from the group of neighboring in-pixel processing units is used as saccadic eye movements to generate a periphery (P) element. The P element generated is used by the subtraction circuit to generate a fovea (F) element of the in-pixel processing unit. The F element in pixel level generated is sent to the absolute circuit via pixel mapping to generate lateral *geniculate* nucleus (LGN) element of the in-pixel processing unit.

In certain embodiments, the P element, the F element, and the LGN element from each of in-pixel processing unit of the in-pixel processing array are combined at a feature vector generator to form a P feature vector, an F feature vector, and an LGN feature vector of the in-pixel processing array. The P feature vector, the F feature vector, and the LGN feature vector of the in-pixel processing array are used by a neural network processor to detect the object, to identify the object, and to determine the location of the object. A region and object of interest identifier identifies a region and object of interest from the object detected and identified by the neural network processor and provide feedback of the identified region and object of interest and the processed P, F, and LGN feature vectors of the brain-like in-pixel intelligent processing system to the in-pixel processing array to improve the object detection and identification.

In certain embodiments, the group of neighboring in-pixel processing units is selected according to saccadic eye movements, and centered at the in-pixel processing unit in a form of sub-window array.

In certain embodiments, the group of neighboring in-pixel processing units includes: a first neighboring in-pixel processing unit, a second neighboring in-pixel processing unit, a third neighboring in-pixel processing unit, . . . , and a (Q−1)th neighboring in-pixel processing unit.

In certain embodiments, the P element, the F element of the in-pixel processing unit, are parallelly delivered in an array form through a periphery sub-window array and a fovea sub-window array.

In certain embodiments, the set of input channels of the in-pixel processing unit comprises: a first input channel from the in-pixel processing unit, a second input channel from the first neighboring in-pixel processing unit, a third input channel from the second neighboring in-pixel processing unit, . . . , and a Q-th input channel from the (Q−1)-th neighboring in-pixel processing unit.

In another aspect, the present disclosure relates to a brain-like in-pixel intelligent processing system. In certain embodiments, the brain-like in-pixel intelligent processing system is built on a silicon chip, and includes: an in-pixel processing array, a feature vector generator, a neural network processor, and a region and object of interest identifier. The in-pixel processing array includes a group of in-pixel processing unit having N columns and M rows of in-pixel processing units, where N and M are positive integer, forms an image acquisition and bio-inspired processing imager configured to processes raw gray information in a pixel level, and each of in-pixel processing units produces a periphery (P) element, a fovea (F) element, and a lateral *geniculate* nucleus (LGN) element of the in-pixel processing unit. The feature vector generator receives and processes the P element, the F element, and the LGN element from each of in-pixel processing units of the in-pixel processing array and generates the P feature vector, the F feature vector, and the LGN feature vector of the in-pixel processing array. The neural network processor receives and processes the P feature vector, the F feature vector, and the LGN feature vector of the in-pixel processing array received, detects an object, identifies the object, and determines a location of the object. The region and object of interest identifier is used to identify the region and object of interest from the object detected and identified by the neural network processor and provide feedback of the identified region and object of interest and the processed P, F, and LGN feature vectors of the brain-like in-pixel intelligent processing system to the in-pixel processing array to improve the object detection and identification.

In certain embodiments, each of the in-pixel processing units includes: a photogate sensor, an average circuit, a subtraction circuit, and an absolute circuit. The photogate sensor captures a pixel of an image of an object and produces an $I_{out}$ current to the in-pixel processing array from the in-pixel processing unit. The average circuit receives and averages $I_{out}$ current from the in-pixel processing unit and a group of neighboring in-pixel processing units through a set of input channels. The averaged $I_{out}$ current from the group of neighboring in-pixel processing units is used as saccadic eye movements to generate a P element of the in-pixel processing unit. The P element generated is used by the subtraction circuit to generate the F element of the in-pixel processing unit. The F element in pixel level generated is sent to the absolute circuit via pixel mapping to generate the LGN element of the in-pixel processing unit.

In certain embodiments, the group of neighboring in-pixel processing units is selected according to saccadic eye movements, and centered at the in-pixel processing unit in a form of sub-window array.

In yet another aspect, the present disclosure relates to a method of using a brain-like in-pixel intelligent processing system. In certain embodiments, the method includes one or more of the following operations:

exposing an object to the brain-like in-pixel intelligent processing system, the brain-like in-pixel intelligent processing system includes: an in-pixel processing array configured to acquire raw gray information of the object, and to process the raw gray information acquired in a pixel level, a feature vector generator, a neural network processor, and a region and object of interest identifier, the in-pixel processing array includes a group of in-pixel processing units and each of the group of in-pixel processing units includes a set of input channels, a photogate sensor, an average circuit, a subtraction circuit, and an absolute circuit;

producing, by the photogate sensor of each of the group of in-pixel processing units, an $I_{out}$ current of the in-pixel processing unit in response to the exposure to the object;

averaging, by the average circuit of each of the group of in-pixel processing units, the $I_{out}$ current from the in-pixel processing unit and a group of neighboring in-pixel processing units to generate a periphery (P) element of the in-pixel processing unit;

subtracting, by the subtraction circuit of each of the group of in-pixel processing units, the P element from the each of the group of in-pixel processing units to generate a corresponding fovea (F) element for each of the group of in-pixel processing units;

producing, by the absolute circuit each of the group of in-pixel processing units, a corresponding lateral *geniculate* nucleus (LGN) element for each of the group of in-pixel processing units from each of the corresponding F elements of the plurality of in-pixel processing units;

generating, by the feature vector generator of the brain-like in-pixel intelligent processing system, a corresponding P feature vector, F feature vector, and LGN feature vector from each of the corresponding P elements, F elements, and LGN elements of each of the plurality of in-pixel processing units;

processing, by the neural network processor, the P feature vector, the F feature vector, and the LGN feature vector of the plurality of in-pixel processing units to detect the object, to identify the object, and to determine the location of the object;

identifying, by the region and object of interest identifier, the region and object of interest from the object detected and identified by the neural network processor 16; and transmitting, by the region and object of interest identifier, the identified region and object of interest and the processed P, F, and LGN feature vectors of the brain-like in-pixel intelligent processing system to the in-pixel processing array to improve the object detection and identification.

In certain embodiments, the brain-like in-pixel intelligent processing system includes: the in-pixel processing array, the feature vector generator, the neural network processor, and the region and object of interest identifier. The in-pixel processing array includes a group of in-pixel processing unit having N columns and M rows of in-pixel processing units, where N and M are positive integer, and forms an image acquisition and bio-inspired processing imager configured to processes raw gray information in a pixel level. Each of in-pixel processing units produces the P element, the F element, and the LGN element of the in-pixel processing unit. The feature vector generator receives and processes the P element, the F element, and the LGN element from each of in-pixel processing units of the in-pixel processing array and generates the P feature vector, the F feature vector, and the LGN feature vector of the in-pixel processing array. The neural network processor receives and processes the P feature vector, the F feature vector, and the LGN feature vector of the in-pixel processing array received, detects an object, identifies the object, and determines a location of the object. The region and object of interest identifier is used to identify the region and object of interest from the object detected and identified by the neural network processor and provide feedback of the identified region and object of interest and the processed P, F, and LGN feature vectors of the brain-like in-pixel intelligent processing system to the in-pixel processing array to improve the object detection and identification.

In certain embodiments, each of the in-pixel processing units includes: the photogate sensor, the average circuit, the subtraction circuit, and the absolute circuit. The photogate sensor captures a pixel of an image of an object and produces an Iout current to the in-pixel processing array from the in-pixel processing unit. The average circuit receives and averages $I_{out}$ current from the in-pixel processing unit and the group of neighboring in-pixel processing units through a set of input channels. The averaged $I_{out}$ current from the group of neighboring in-pixel processing units is used as saccadic eye movements to generate a P element of the in-pixel processing unit. The P element generated is used by the subtraction circuit to generate the F element of the in-pixel processing unit. The F element in pixel level generated is sent to the absolute circuit via pixel mapping to generate the LGN element of the in-pixel processing unit.

In certain embodiments, the group of neighboring in-pixel processing units is selected according to saccadic eye movements, and centered at the in-pixel processing unit in a form of sub-window array.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein:

FIG. 2 illustrates an in-pixel processing array according to certain embodiments of the present disclosure;

DETAILED DESCRIPTION

Figure 1:
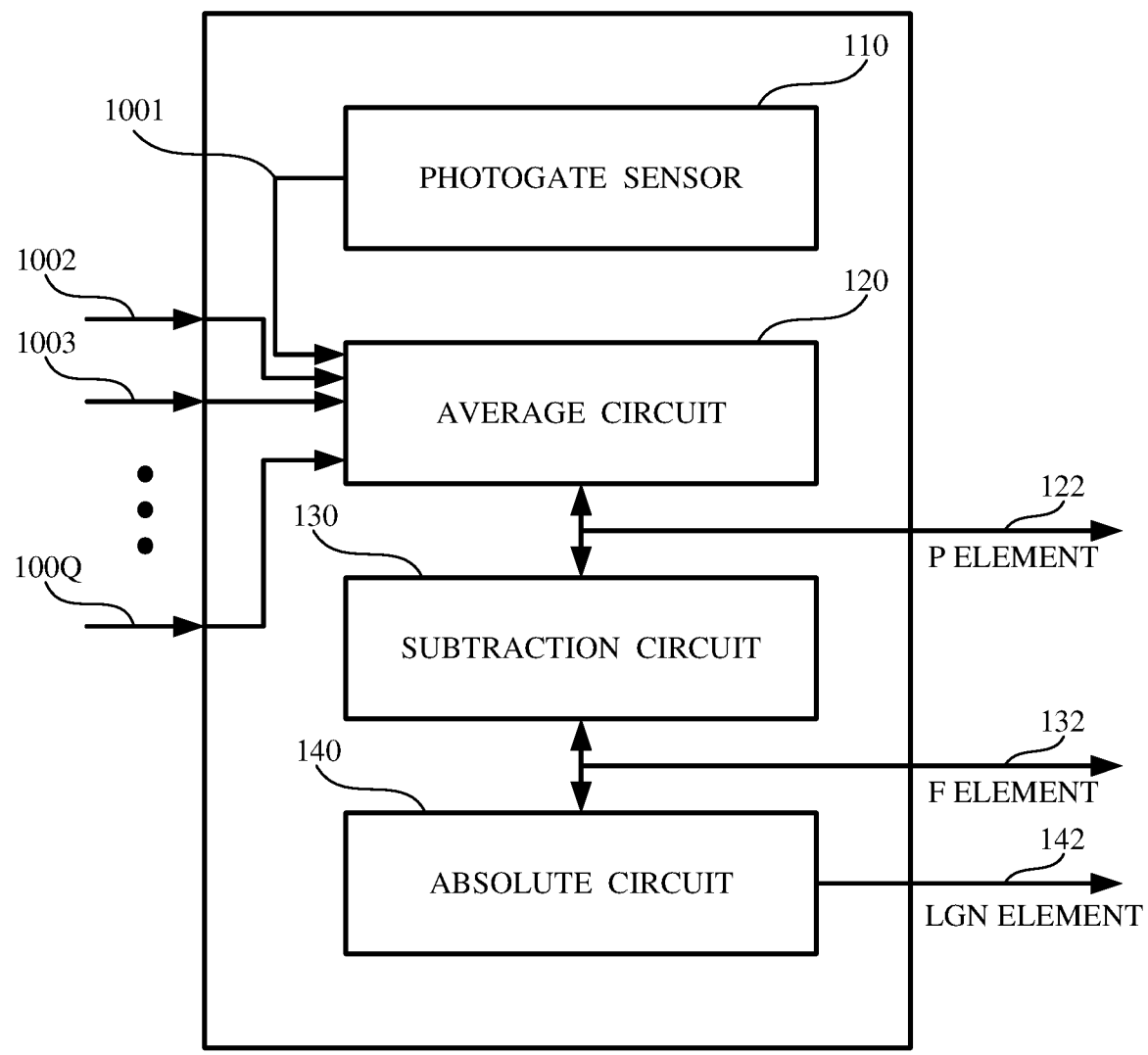
FIG. 1 shows a block diagram of an in-pixel processing unit according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments disclosed herein provide systems and methods for object recognition in image or video data. The example embodiments may be considered to be a bio-inspired model that emulates saccadic eye movements and extracts features from captured image data based on a biological visual pathway, such as by emulating the retina, fovea, and lateral *geniculate* nucleus (LGN) of a vertebrate. In embodiments, an input image is provided to a saccadic eye emulator that may sequentially scan the input image to focus on one or more objects of interest and/or features within the object (e.g., when the input image includes a person, the saccadic eye emulator may focus on the eyes, nose, lips, etc., of the face of the person). Statistical data of components within the object (e.g., one or more features) may be constructed from different locations of different light intensity of the input image. In embodiments, the saccadic eye emulator generates a set of images or blocks in different locations of the input image. Principal component analysis (PCA) and/or feature extraction algorithms (FEA) may be used to obtain vertebrate features and fovea features, which are based on vertebrate retina horizontal cells and retinal ganglion cells, respectively.

Example embodiments disclosed herein further provide systems and methods for identifying whole objects based on one or more (partial) object images. The bio-inspired model for extracting vertebrate features, fovea features, and LGN features is used to process one or both of the input images that form the query request and the stored images of objects in a database from which the query results will be obtained. In some embodiments, one or more searches are conducted in the stored images in the database for each image of the input images that form the query request independently of other images of the input images. And then the results of such independent searches are analyzed to determine best matches to the combination of all of the images forming the query request.

The present disclosure will now be described more fully hereinafter with reference to the accompanying drawings FIGS. 1 through 9, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

In one aspect, as shown in FIGS. 1-7, the present disclosure relates to an in-pixel processing array 12 for a brain-like in-pixel intelligent processing system 10. In certain embodiments, the brain-like in-pixel intelligent processing system 10 is built on a semiconductor chip. As shown in FIG. 2, the in-pixel processing array 12 includes an array of in-pixel processing units 100 shown in FIG. 1. The in-pixel processing array 12 has N columns and M rows of in-pixel processing units 100 P(N, M), where N and M are positive integer. The in-pixel processing array 12 forms an image acquisition and bio-inspired processing imager configured to processes raw gray information in a pixel level.

In certain embodiments, as shown in FIG. 1, each of the in-pixel processing unit 100 includes: a photogate sensor 110, an average circuit 120, a subtraction circuit 130, and an absolute circuit 140.

Figure 4:
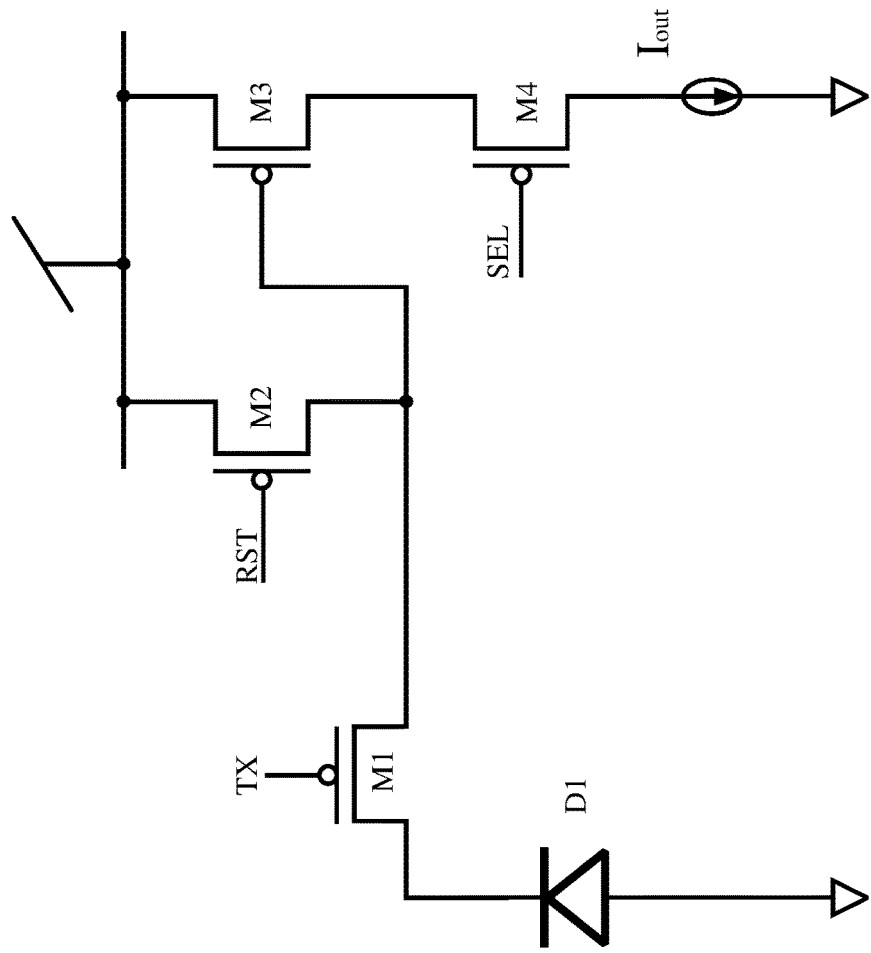
FIG. 4 illustrates an exemplary photo sensor circuit of the in-pixel processing unit according to certain embodiments of the present disclosure.

In certain embodiments, as shown in FIG. 4, the photogate sensor 110 includes a photodiode $D_1$, to capture a pixel of an image of an object and produces an $I_{out}$ current to the in-pixel processing array 12 from the in-pixel processing unit 100. When the in-pixel processing unit 100 is selected by the in-pixel processing array 12 through transistor M4, the $I_{out}$ current produced is sent out of the in-pixel processing unit 100 as output.

Figure 5:
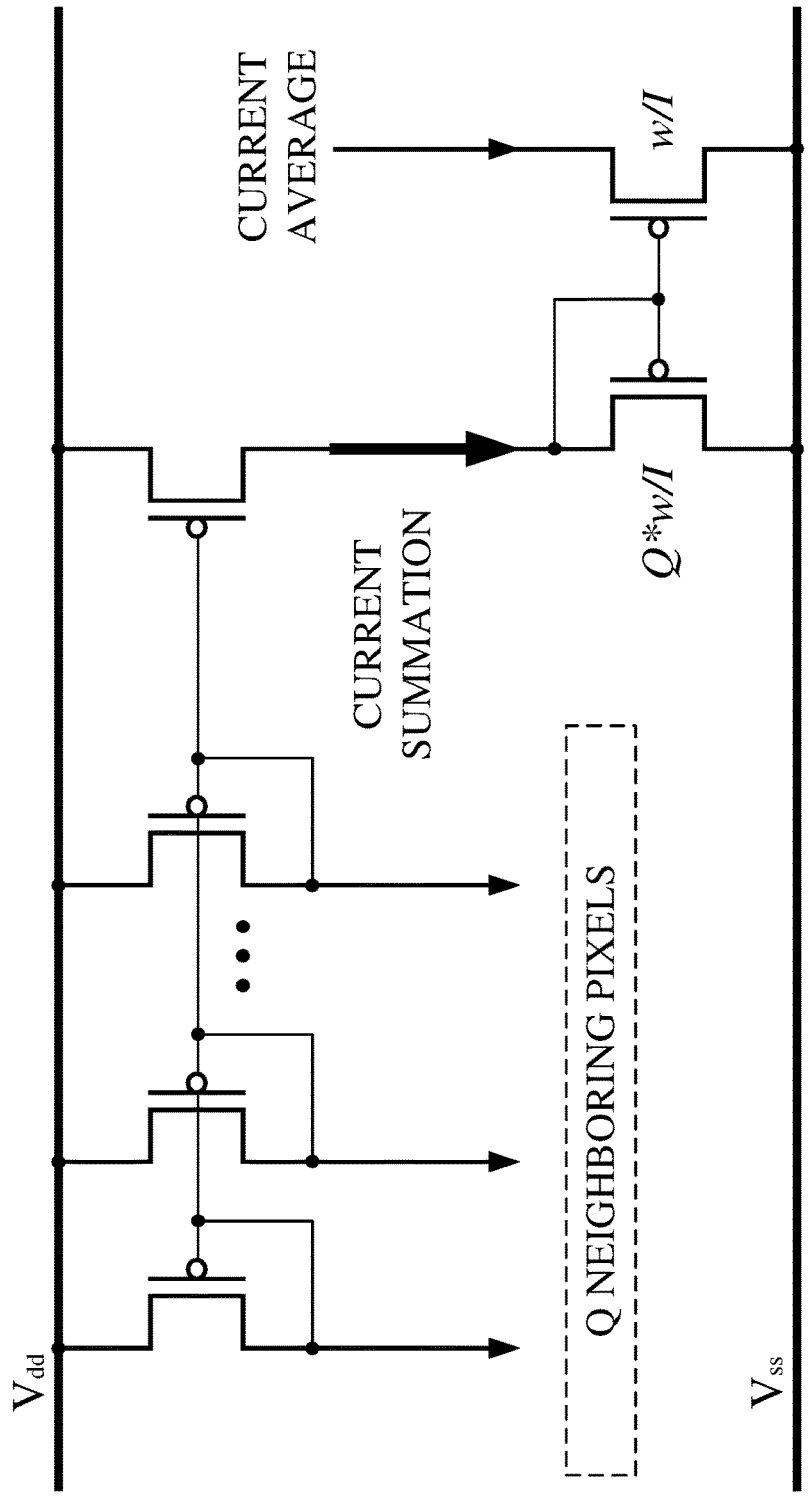
FIG. 5 illustrates an exemplary average circuit of the in-pixel processing unit according to certain embodiments of the present disclosure.

In certain embodiments, as shown in FIG. 1, the average circuit 120 receives the $I_{out}$ current from photogate sensor 110 of the in-pixel processing unit 100 itself through an input channel 1001, and the $I_{out}$ current from a group of neighboring in-pixel processing units through a set of input channels 1002, . . . , and 100Q, where Q is a positive integer. As shown in FIG. 5, the average circuit 120 averages the Q channels of $I_{out}$ current from itself as well as the group of neighboring in-pixel processing units. The averaged Q channels of $I_{out}$ current forms a periphery (P) element 122 and the P element 122 represents emulated saccadic eye movements of the in-pixel processing array 12.

Figure 6:
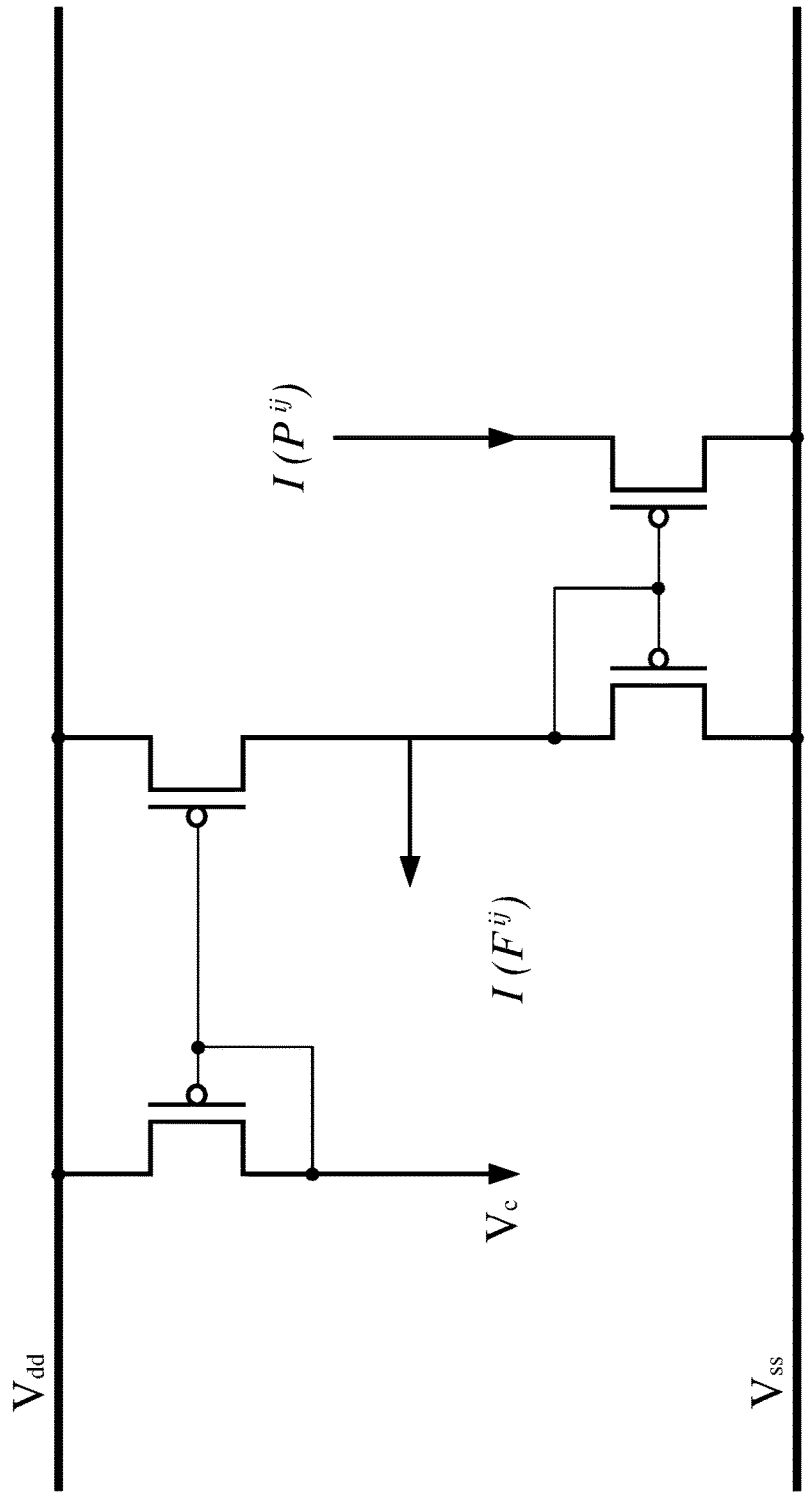
FIG. 6 illustrates an exemplary subtraction circuit of the in-pixel processing unit according to certain embodiments of the present disclosure.

In certain embodiments, the P element 122 generated is an input to the subtraction circuit 130 and the output of the subtraction circuit 130 forms a fovea (F) element 132 of the in-pixel processing unit 100, as shown in FIG. 6.

Figure 7:
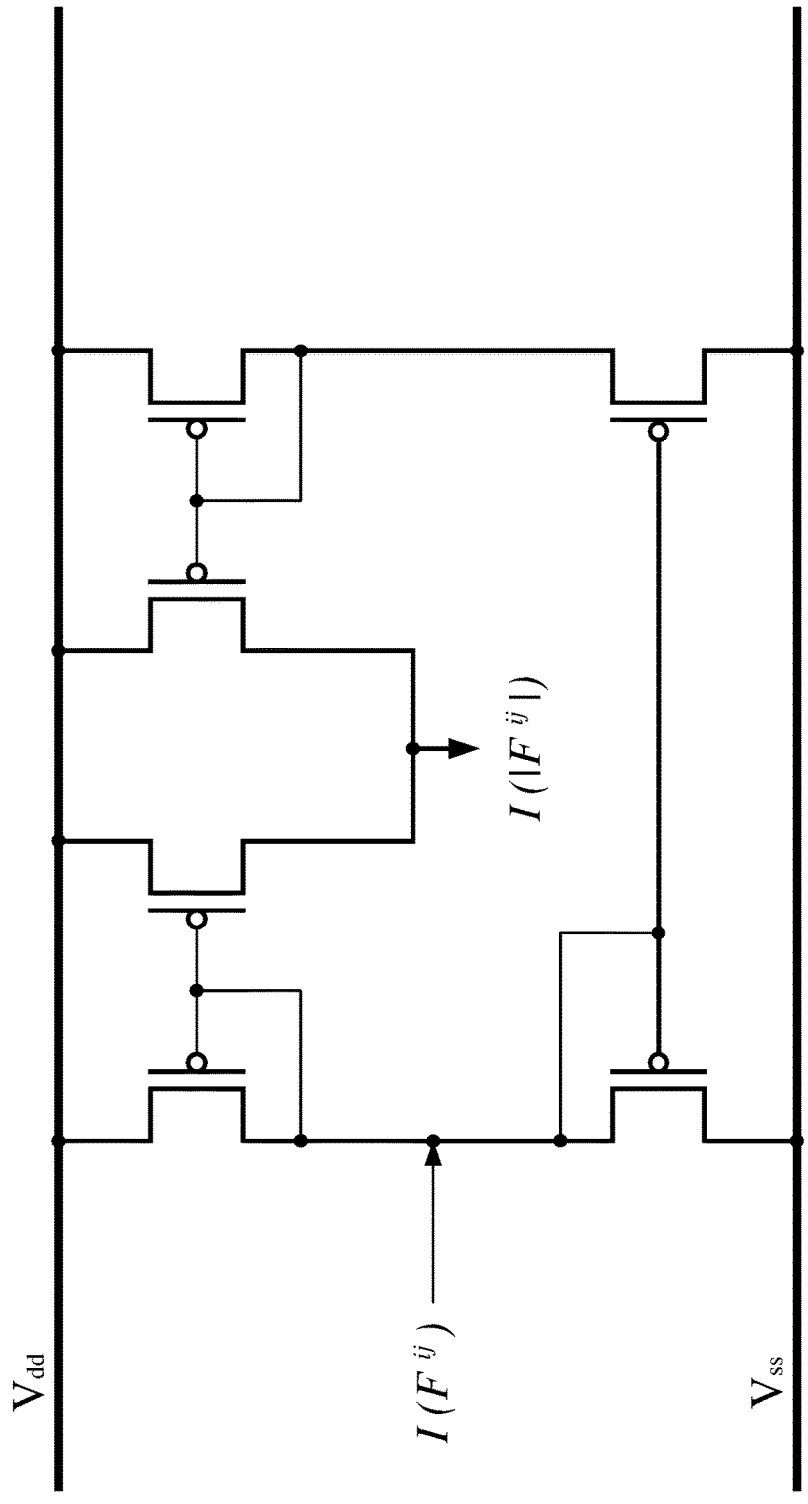
FIG. 7 illustrates an exemplary absolute circuit of the in-pixel processing unit according to certain embodiments of the present disclosure.
Figure 8:
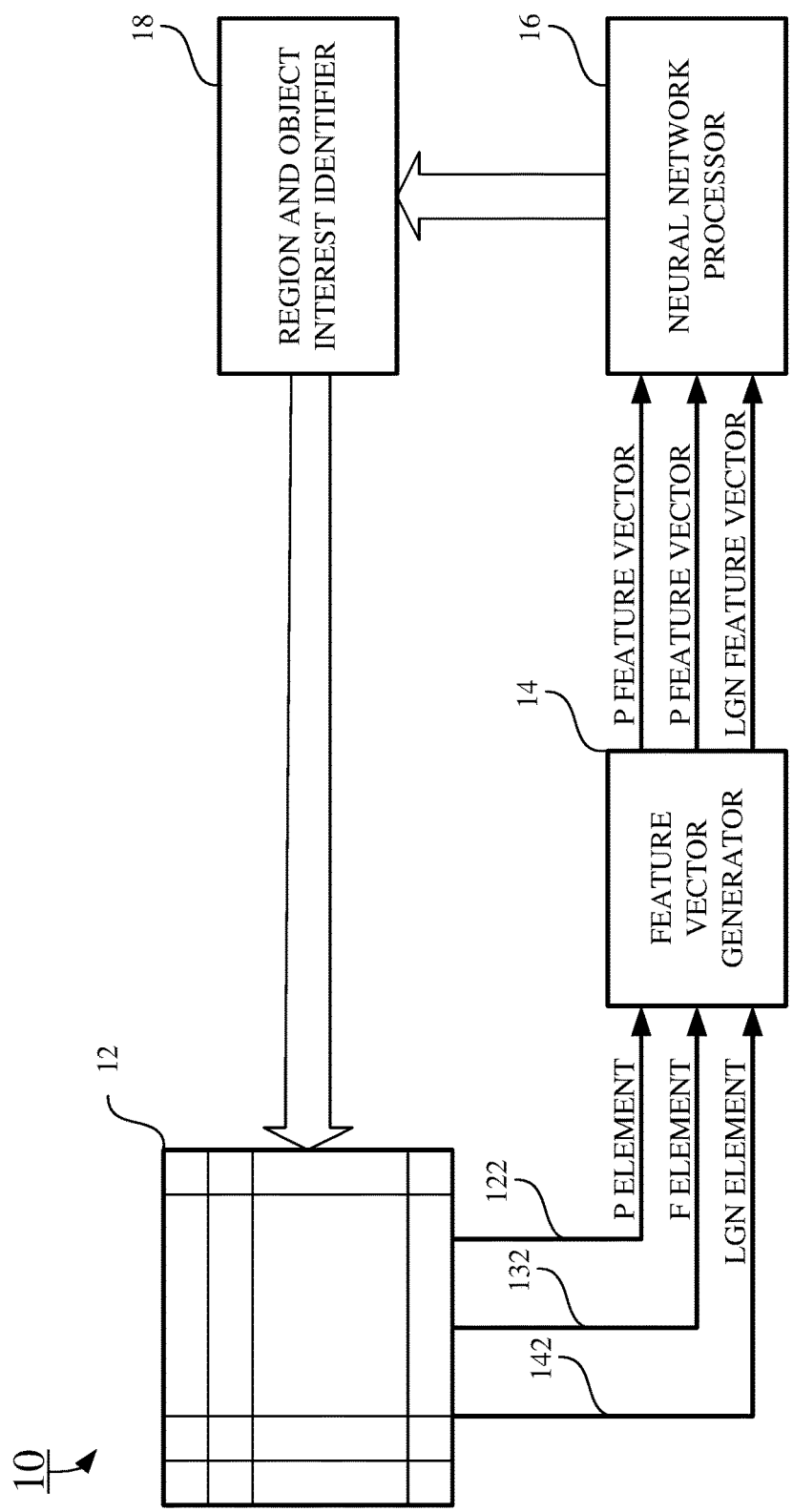
FIG. 8 illustrates a block diagram of a brain-like in-pixel intelligent processing system according to certain embodiments of the present disclosure.

In certain embodiments, as shown in FIG. 7, the F element 132 in pixel level generated is sent to the absolute circuit 140 via pixel mapping to form lateral *geniculate* nucleus (LGN) element 142 of the in-pixel processing unit 100.

In certain embodiments, the group of neighboring in-pixel processing units is selected according to saccadic eye movements, and centered at the in-pixel processing unit 100 in a form of sub-window array.

In certain embodiments, the group of neighboring in-pixel processing units includes: a first neighboring in-pixel processing unit 102, a second neighboring in-pixel processing unit 103, a third neighboring in-pixel processing unit 104, . . . , and a (Q−1)th neighboring in-pixel processing unit 10Q.

In certain embodiments, the set of input channels of the in-pixel processing unit 100 comprises: a first input channel 1001 from the in-pixel processing unit 100 itself, a second input channel 1002 from the first neighboring in-pixel processing unit 102, a third input channel 1003 from the second neighboring in-pixel processing unit 103, . . . , and a Q-th input channel 100Q from the (Q−1)-th neighboring in-pixel processing unit 10Q.

Figure 3:
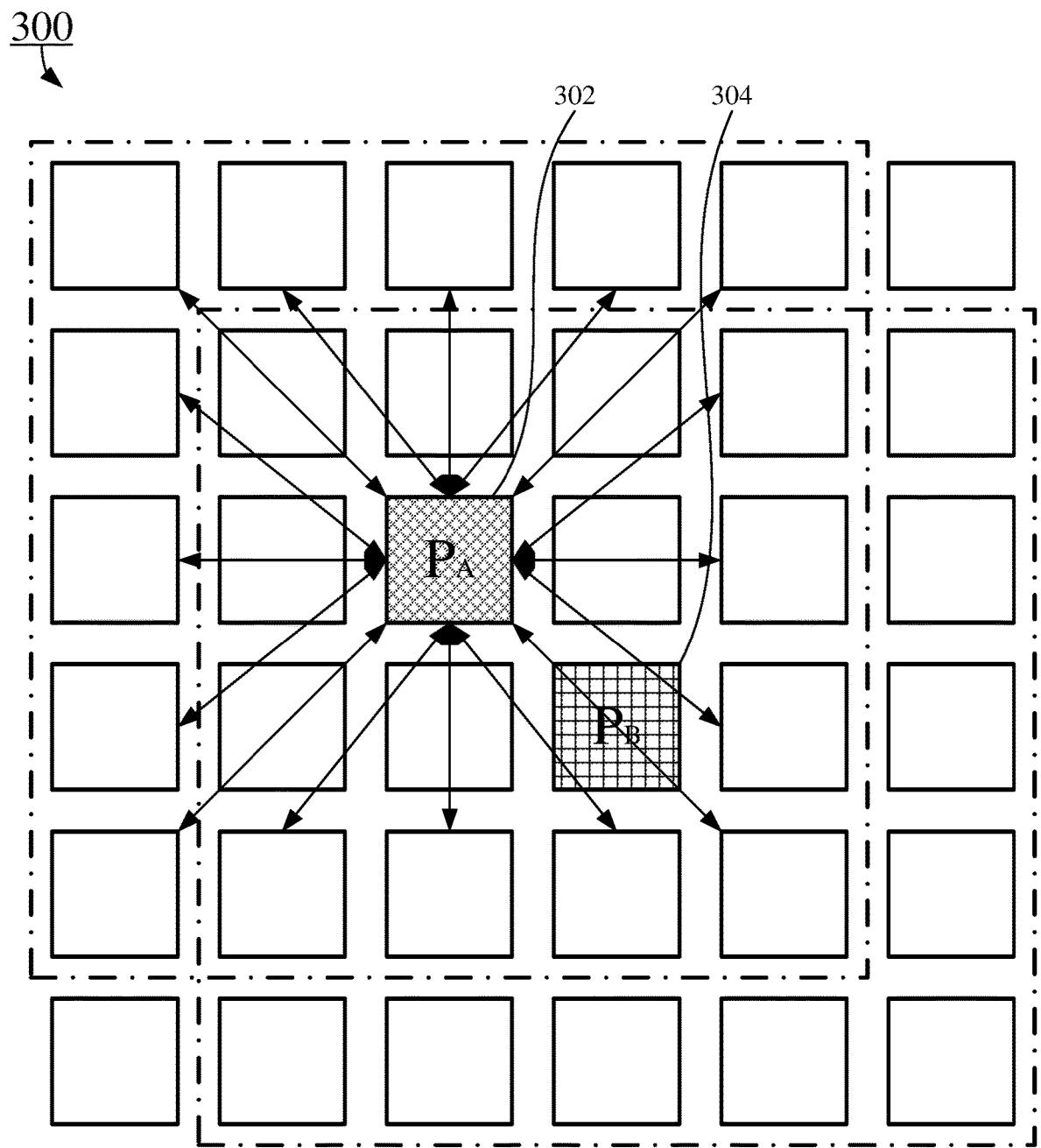
FIG. 3 illustrates two exemplary sub-windows of neighboring in-pixel processing units according to certain embodiments of the present disclosure.

In one embodiment, the group of neighboring in-pixel processing units forms a square array as shown in FIG. 3. A first sub-window of 25 in-pixel processing units 100 is centered at an in-pixel processing unit $P_A$ 302, and a second sub-window of 25 in-pixel processing units 100 is centered at an in-pixel processing unit $P_B$ 304. In this embodiment, the Q is 25 and N=M=5. In other embodiments, the size of neighboring in-pixel processing units sub-window array may be N=M=8, 12, or 16. Each of the neighboring in-pixel processing units includes a bi-directional communication channel to transmit the $I_{out}$ to and from the corresponding in-pixel processing units 100 to the center in-pixel processing unit $P_A$ 302 or $P_B$ 304, as shown by the arrows between each in-pixel processing units 100.

In another embodiment, the group of neighboring in-pixel processing units forms a round array, a hexagon array, an octagon array, or an array of any other shapes and the neighboring in-pixel processing units are always centered at the in-pixel processing unit 100.

In certain embodiments, the P element 122, the F element 132 of the in-pixel processing unit 100, are parallelly delivered in an array form through a periphery sub-window array and a fovea sub-window array.

In certain embodiments, the P element 122, the F element 132, and the LGN element 142 from each of in-pixel processing unit 100 of the in-pixel processing array 12 are combined at a feature vector generator 14 to form a P feature vector, an F feature vector, and an LGN feature vector of the in-pixel processing array 12. The P feature vector, the F feature vector, and the LGN feature vector of the in-pixel processing array 12 are used by a neural network processor 16 to detect the object, to identify the object, and to determine the location of the object. A region and object of interest identifier 18 is used to identify the region and object of interest from the object detected and identified by the neural network processor 16 and provide feedback of the identified region and object of interest and the processed P, F, and LGN feature vectors of the brain-like in-pixel intelligent processing system to the in-pixel processing array to improve the object detection and identification.

In another aspect, the present disclosure relates to a brain-like in-pixel intelligent processing system 10, as shown in FIG. 4. In certain embodiments, the brain-like in-pixel intelligent processing system 10 is built on a semiconductor chip, and includes: an in-pixel processing array 12, a feature vector generator 14, a neural network processor 16, and a region and object of interest identifier 18.

In certain embodiments, as shown in FIG. 2, the in-pixel processing array 12 includes an array of in-pixel processing units 100, as shown in FIG. 1. The in-pixel processing array 12 has N columns and M rows of in-pixel processing units 100 P(N, M), where N and M are positive integer. The in-pixel processing array 12 forms an image acquisition and bio-inspired processing imager configured to processes raw gray information in a pixel level. In certain embodiments, as shown in FIG. 1, each of the in-pixel processing unit 100 includes: a photogate sensor 110, an average circuit 120, a subtraction circuit 130, and an absolute circuit 140. The photogate sensor 110 captures a pixel of an image of an object and produces an $I_{out}$ current to the in-pixel processing array 12 from the in-pixel processing unit 100. The average circuit 120 receives and averages the $I_{out}$ current from the in-pixel processing unit 100 and a group of neighboring in-pixel processing units through a set of input channels 1001, 1002, . . . , and 100Q, where Q is a positive integer. The averaged $I_{out}$ current from the group of neighboring in-pixel processing units represents saccadic eye movements to generate a periphery (P) element 122. The P element 122 generated is used by the subtraction circuit 130 to generate a fovea (F) element 132 of the in-pixel processing unit 100. The F element 132 in pixel level generated is sent to the absolute circuit 140 via pixel mapping to generate lateral *geniculate* nucleus (LGN) element 142 of the in-pixel processing unit 100.

In certain embodiments, the group of neighboring in-pixel processing units is selected according to saccadic eye movements, and centered at the in-pixel processing unit 100 in a form of sub-window array.

In certain embodiments, the group of neighboring in-pixel processing units includes: a first neighboring in-pixel processing unit 102, a second neighboring in-pixel processing unit 103, a third neighboring in-pixel processing unit 104, . . . , and a (Q-1)th neighboring in-pixel processing unit 10Q.

In certain embodiments, the set of input channels of the in-pixel processing unit 100 comprises: a first input channel 1001 from the in-pixel processing unit 100 itself, a second input channel 1002 from the first neighboring in-pixel processing unit 102, a third input channel 1003 from the second neighboring in-pixel processing unit 103, . . . , and a Q-th input channel 100Q from the (Q-1)-th neighboring in-pixel processing unit 10Q.

In one embodiment, the group of neighboring in-pixel processing units forms a square array as shown in FIG. 3. A first sub-window of 25 in-pixel processing units 100 is centered at an in-pixel processing unit $P_A$ 302, and a second sub-window of 25 in-pixel processing units 100 is centered at an in-pixel processing unit $P_B$ 304. In this embodiment, the Q is 25 and N=M=5. In other embodiments, the size of neighboring in-pixel processing units sub-window array may be N=M=8, 12, or 16. Each of the neighboring in-pixel processing units includes a bi-directional communication channel to transmit the $I_{out}$ to and from the corresponding in-pixel processing units 100 to the center in-pixel processing unit $P_A$ 302 or $P_B$ 304, as shown by the arrows between each in-pixel processing units 100.

In another embodiment, the group of neighboring in-pixel processing units forms a round array, a hexagon array, an octagon array, or an array of any other shapes and the neighboring in-pixel processing units are always centered at the in-pixel processing unit 100.

In certain embodiments, the P element 122, the F element 132 of the in-pixel processing unit 100, are parallelly delivered in an array form through a periphery sub-window array and a fovea sub-window array.

In certain embodiments, the feature vector generator 14 receives and processes the P element, the F element, and the LGN element from each of in-pixel processing units 100 of the in-pixel processing array 12 and generates the P feature vector, the F feature vector, and the LGN feature vector of the in-pixel processing array 12.

In certain embodiments, the neural network processor 16 receives and processes the P feature vector, the F feature vector, and the LGN feature vector of the in-pixel processing array 12 received according to certain brain-like intelligent processing algorithms to detect the object, to identify the object, and to determine the location of the object.

In certain embodiments, the region and object of interest identifier 18 identifies the region and object of interest from the object detected and identified by the neural network processor 16 and provides feedback of the identified region and object of interest and the processed P, F, and LGN feature vectors of the brain-like in-pixel intelligent processing system to the in-pixel processing array to improve the object detection and identification.

In yet another aspect, the present disclosure relates to a method of using a brain-like in-pixel intelligent processing system 10. In certain embodiments In certain embodiments, the brain-like in-pixel intelligent processing system 10 is built on a semiconductor chip, and includes: an in-pixel processing array 12 configured to acquire raw gray information of the object, and to process the raw gray information acquired in a pixel level, a feature vector generator 14, a neural network processor 16, and a region and object of interest identifier 18, the in-pixel processing array 12 includes a group of in-pixel processing units 100 and each of the group of in-pixel processing units 100 includes a set of input channels, a photogate sensor 110, an average circuit 120, a subtraction circuit 130, and an absolute circuit 140.

In certain embodiments, the method includes one or more of the following operations:
- exposing an object to the brain-like in-pixel intelligent processing system 10;
- producing, by the photogate sensor 110 of each of the group of in-pixel processing units 100, an $I_{out}$ current of the in-pixel processing unit 100 in response to the exposure to the object;
- averaging, by the average circuit 120 of each of the group of in-pixel processing units 100, the $I_{out}$ current from the in-pixel processing unit 100 and a group of neighboring in-pixel processing units to generate a periphery (P) element 122 of the in-pixel processing unit 100;
- subtracting, by the subtraction circuit 130 of each of the group of in-pixel processing units 100, the P element 122 from the each of the group of in-pixel processing units 100 to generate a corresponding fovea (F) element 132 for each of the group of in-pixel processing units 100;
- producing, by the absolute circuit 140 each of the group of in-pixel processing units 100, a corresponding lateral *geniculate* nucleus (LGN) element 142 for each of the group of in-pixel processing units 100 from each of the corresponding F elements 122 of the group of in-pixel processing units 100;
- generating, by the feature vector generator 14 of the brain-like in-pixel intelligent processing system 10, a corresponding P feature vector, F feature vector, and LGN feature vector from each of the corresponding P elements 122, F elements 132, and LGN elements 142 of each of the group of in-pixel processing units 100;
- processing, by the neural network processor 16, the P feature vector, the F feature vector, and the LGN feature vector of the group of in-pixel processing units 100 to detect the object, to identify the object, and to determine the location of the object;
- identifying, by the region and object of interest identifier 18, a region and object of interest from the object detected and identified by the neural network processor 16; and
- transmitting, by the region and object of interest identifier 18, the identified region and object of interest and the processed P, F, and LGN feature vectors of the brain-like in-pixel intelligent processing system 10 to the in-pixel processing array 12 to improve the object detection and identification.

Figure 9:
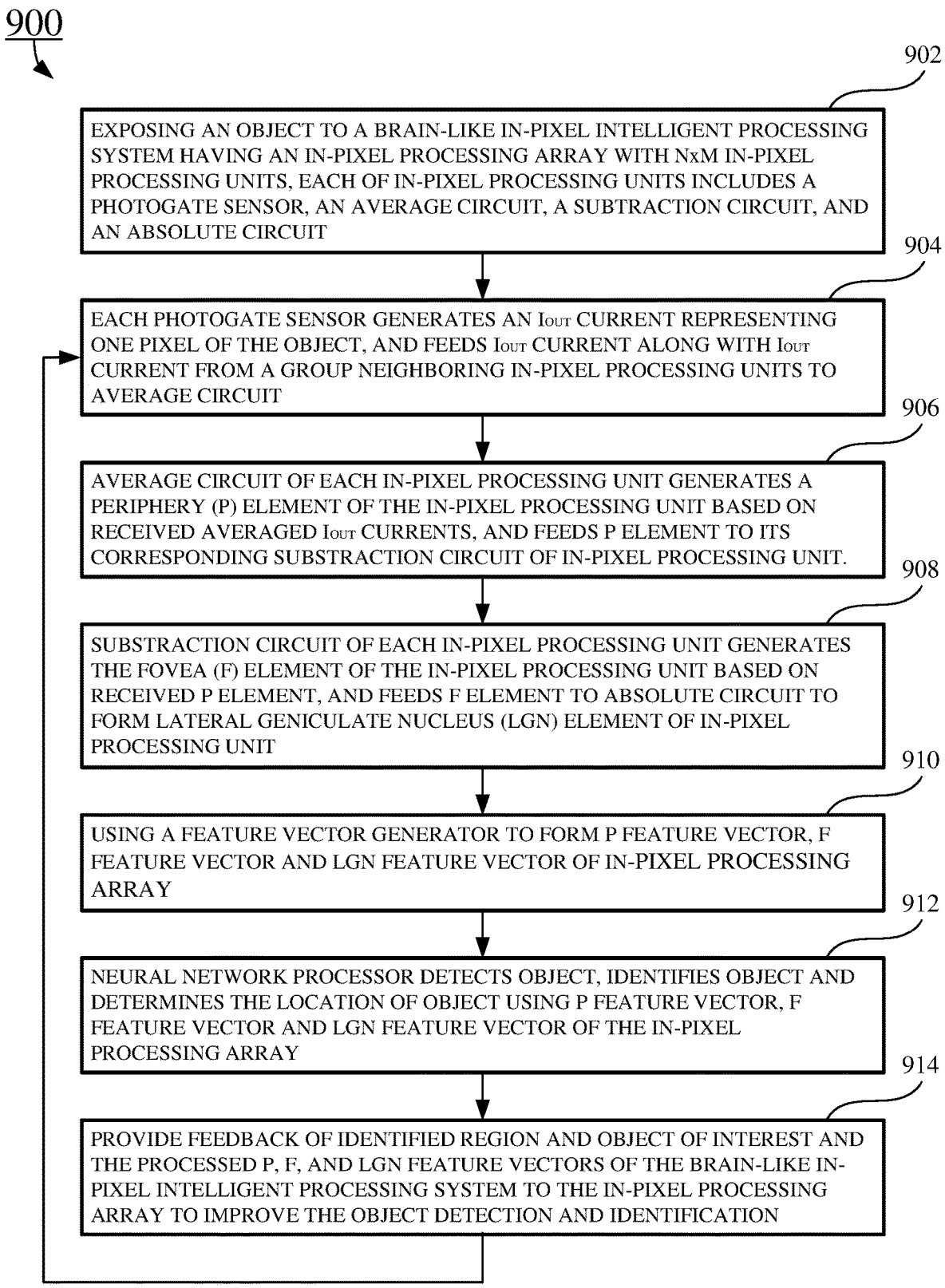
FIG. 9 shows a flow chart of a method of using the brain-like in-pixel intelligent processing system according to certain embodiments of the present disclosure.

Referring now to FIG. 9, a flow chart of a method 900 of using the brain-like in-pixel intelligent processing system is shown according to certain embodiments of the present disclosure.

At block 902, exposing an object to the brain-like in-pixel intelligent processing system 10, the brain-like in-pixel intelligent processing system 10 includes an in-pixel processing array 12 having N×M in-pixel processing units 100, and each of the in-pixel processing units 100 includes a set of input channels, a photogate sensor 110, an average circuit 120, a subtraction circuit 130, and an absolute circuit 140;

At block 904, the photogate sensor 110 of each of the in-pixel processing units 100 generates an Iout current representing one pixel of the object, feeds the Iout current along with Iout currents from a group of neighboring in-pixel processing units to the average circuit 120.

At block 906, the average circuit 120 averages received Iout current along with Iout currents from the group of neighboring in-pixel processing units to form periphery (P) element 122 of the in-pixel processing unit 100, and feeds the P element 122 to the subtraction circuit 130 of the in-pixel processing unit 100.

At block 908, the subtraction circuit 130 generates a fovea (F) element 132 based on received the P element 122 from the average circuit 120, feeds the F element 132 to the absolute circuit 140 of the in-pixel processing unit 100 to form a lateral *geniculate* nucleus (LGN) element 142.

At block 910, the feature vector generator 14 generates a P feature vector, a F feature vector, and a LGN feature vector of the in-pixel processing array 12, based on the P elements, the F elements, and the LGN elements of the in-pixel processing array 12.

At block 912, the neural network processor 16 detects the object, identifies the object, and determines the location of the object based on the P feature vector, the F feature vector, and the LGN feature vector received from the in-pixel processing array 12.

At block 914, the region and object of interest identifier 18 identifies a region and object of interest from the object detected and identified by the neural network processor 16, and provides feedback of the identified region and object of interest and the processed P, F, and LGN feature vectors of the brain-like in-pixel intelligent processing system to the in-pixel processing array to improve the object detection and identification.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An in-pixel processing array for a brain-like in-pixel intelligent processing system, comprising:
   a plurality of in-pixel processing units, wherein the in-pixel processing array forms an image acquisition and bio-inspired processing imager configured to processes raw gray information in a pixel level; wherein each of the in-pixel processing units comprises:

a photogate sensor, wherein the photogate sensor captures a pixel of the image of an object and produces an $I_{out}$ current to the in-pixel processing array;

an average circuit, wherein the average circuit receives and averages $I_{out}$ current from the in-pixel processing unit and a plurality of neighboring in-pixel processing units through a plurality of input channels, and the averaged $I_{out}$ current from the plurality of neighboring in-pixel processing units is used as saccadic eye movements to generate a periphery (P) element;

a subtraction circuit, wherein the periphery (P) element generated is used by the subtraction circuit to generate a fovea (F) element of the in-pixel processing unit; and an absolute circuit, wherein F element generated in pixel level is sent to the absolute circuit via pixel mapping to generate lateral *geniculate* nucleus (LGN) element of the in-pixel processing unit, wherein the P element, the F element, and the LGN element from each of in-pixel processing unit of the in-pixel processing array are combined at a feature vector generator to form a P feature vector, an F feature vector, and an LGN feature vector of the in-pixel processing array, the P feature vector, the F feature vector, and the LGN feature vector are used by a neural network processor to detect the object, to identify the object, and to determine the location of the object, and a region and object of interest identifier identifies a region and object of interest from the object detected and identified by the neural network processor and provide feedback of the identified region and object of interest and the processed P, F, and LGN feature vectors of the brain-like in-pixel intelligent processing system to the in-pixel processing array to improve the object detection and identification.

2. The in-pixel processing array according to claim 1, wherein the plurality of in-pixel processing units comprises: N columns, and M rows of in-pixel processing unit, where N is a positive integer, and M is a positive integer.

3. The in-pixel processing array according to claim 1, wherein the plurality of neighboring in-pixel processing units is selected according to saccadic eye movements, and centered at the in-pixel processing unit in a form of sub-window array.

4. The in-pixel processing array according to claim 3, wherein the P element, the F element of the in-pixel processing unit, are parallelly delivered in an array form through a periphery sub-window array and a fovea sub-window array.

5. The in-pixel processing array according to claim 4, wherein the plurality of neighboring in-pixel processing units comprises: a first neighboring in-pixel processing unit, a second neighboring in-pixel processing unit, a third neighboring in-pixel processing unit, . . . , and a (Q-1)th neighboring in-pixel processing unit.

6. The in-pixel processing array according to claim 5, wherein the plurality of input channels of the in-pixel processing unit comprises: a first input channel from the in-pixel processing unit, a second input channel from the first neighboring in-pixel processing unit, a third input channel from the second neighboring in-pixel processing unit, . . . , and a Q-th input channel from the (Q-1)-th neighboring in-pixel processing unit.

7. A brain-like in-pixel intelligent processing system, comprising:

an in-pixel processing array, wherein the in-pixel processing array comprises a plurality of in-pixel processing units, forms an image acquisition and bio-inspired processing imager configured to processes raw gray information in a pixel level;

a feature vector generator, wherein the feature vector generator receives and processes the P element, the F element, and the LGN element from each of in-pixel processing units of the in-pixel processing array, and generates the P feature vector, the F feature vector, and the LGN feature vector of the in-pixel processing array;

a neural network processor, wherein the neural network processor receives and processes the P feature vector, the F feature vector, and the LGN feature vector of the in-pixel processing array received;

a region and object of interest identifier, wherein the region and object of interest identifier identifies the region and object of interest from the object detected and identified by the neural network processor, and wherein each of the plurality of in-pixel processing units produces a periphery (P) element, a fovea (F) element, and a lateral *geniculate* nucleus (LGN) element for the in-pixel processing unit, the feature vector generator generates a P feature vector, an F feature vector, and an LGN feature vector of the in-pixel processing array of an image of an object from the P element, the F element, and the LGN element of each of the plurality of in-pixel processing units received, the neural network processor receives and processes the P feature vector, the F feature vector, and the LGN feature vector of the in-pixel processing array, detects the object, recognizes the object, and determines the location of the object, and the region and object of interest identifier provides feedback of the identified region and object of interest and the processed P, F, and LGN feature vectors of the brain-like in-pixel intelligent processing system to the in-pixel processing array to improve the object detection and identification.

8. The brain-like in-pixel intelligent processing system according to claim 7, wherein each of the in-pixel processing units comprises:

a photogate sensor, wherein the photogate sensor captures a pixel of the image of the object and produces an $I_{out}$ current to the in-pixel processing array;

an average circuit, wherein the average circuit receives and averages $I_{out}$ current from the in-pixel processing unit and a plurality of neighboring in-pixel processing units through a plurality of input channels, and the averaged $I_{out}$ current from the plurality of neighboring in-pixel processing units is used as saccadic eye movements to generate a periphery (P) element;

a subtraction circuit, wherein the periphery (P) element generated is used by the subtraction circuit to generate a fovea (F) element of the in-pixel processing unit; and an absolute circuit, wherein F element generated in pixel level is sent to the absolute circuit via pixel mapping to generate lateral *geniculate* nucleus (LGN) element of the in-pixel processing unit.

9. The brain-like in-pixel intelligent processing system according to claim 7, wherein the plurality of in-pixel processing units comprises: N columns, and M rows of in-pixel processing unit, where N is a positive integer, and M is a positive integer.

10. The brain-like in-pixel intelligent processing system according to claim 7, wherein the plurality of neighboring in-pixel processing units is selected according to saccadic eye movements, and centered at the in-pixel processing unit in a form of sub-window array.

11. The brain-like in-pixel intelligent processing system according to claim 10, wherein the P element, the F element of the in-pixel processing unit, are parallelly delivered in an array form through a periphery sub-window array and a fovea sub-window array.

12. The brain-like in-pixel intelligent processing system according to claim 11, wherein the plurality of neighboring in-pixel processing units comprises: a first neighboring in-pixel processing unit, a second neighboring in-pixel processing unit, a third neighboring in-pixel processing unit, . . . , and a (Q−1)th neighboring in-pixel processing unit.

13. The brain-like in-pixel intelligent processing system according to claim 12, wherein the plurality of input channels of the in-pixel processing unit comprises: a first input channel from the in-pixel processing unit, a second input channel from the first neighboring in-pixel processing unit, a third input channel from the second neighboring in-pixel processing unit, . . . , and a Q-th input channel from the (Q−1)-th neighboring in-pixel processing unit.

14. A method of using a brain-like in-pixel intelligent processing system, comprising:
   exposing an object to the brain-like in-pixel intelligent processing system, wherein the brain-like in-pixel intelligent processing system comprises: an in-pixel processing array configured to acquire raw gray information of the object, and to process the raw gray information acquired in a pixel level, a feature vector generator, and a neural network processor, and wherein the in-pixel processing array comprises a plurality of in-pixel processing units and each of the plurality of in-pixel processing units comprises a plurality of input channels, a photogate sensor, an average circuit, a subtraction circuit, and an absolute circuit;
   producing, by the photogate sensor of each of the plurality of in-pixel processing units, an $I_{out}$ current of the in-pixel processing unit in response to the exposure to the object;
   averaging, by the average circuit of each of the plurality of in-pixel processing units, the $I_{out}$ current from the in-pixel processing unit and a plurality of neighboring in-pixel processing units to generate a periphery (P) element of the in-pixel processing unit;
   subtracting, by the subtraction circuit of each of the plurality of in-pixel processing units, the P element from the each of the plurality of in-pixel processing units to generate a corresponding fovea (F) element for each of the plurality of in-pixel processing units;
   producing, by the absolute circuit each of the plurality of in-pixel processing units, a corresponding lateral *geniculate* nucleus (LGN) element for each of the plurality of in-pixel processing units from each of the corresponding F elements of the plurality of in-pixel processing units;
   generating, by the feature vector generator of the brain-like in-pixel intelligent processing system, a corresponding P feature vector, F feature vector, and LGN feature vector from each of the corresponding P elements, F elements, and LGN elements of each of the plurality of in-pixel processing units;
   processing, by the neural network processor, the P feature vector, the F feature vector, and the LGN feature vector of the plurality of in-pixel processing units to detect the object, to identify the object, and determine the location of the object;
   identifying, by the region and object of interest identifier, the region and object of interest from the object detected and identified by the neural network processor; and
   transmitting, by the region and object of interest identifier, the identified region and object of interest and the processed P, F, and LGN feature vectors of the brain-like in-pixel intelligent processing system to the in-pixel processing array to improve the object detection and identification.

15. The method according to claim 14, wherein the brain-like in-pixel intelligent processing system comprises:
   the in-pixel processing array, wherein the in-pixel processing array comprises the plurality of in-pixel processing units, forms an image acquisition and bio-inspired processing imager configured to processes raw gray information in a pixel level, and each of the plurality of in-pixel processing units produces the P element, the F element, and the LGN element of the in-pixel processing unit,
   the feature vector generator, wherein the feature vector generator receives and processes the P element, the F element, and the LGN element from each of in-pixel processing units of the in-pixel processing array, and generates the P feature vector, the F feature vector, and the LGN feature vector of the in-pixel processing array;
   the neural network processor, wherein the neural network processor receives and processes the P feature vector, the F feature vector, and the LGN feature vector of the in-pixel processing array received, detects the object, recognizes the object, and determines the location of the object; and
   the region and object of interest identifier, wherein the region and object of interest identifier identifies the region and object of interest from the object detected and identified by the neural network processor, and provides feedback of the identified region and object of interest and the processed P, F, and LGN feature vectors of the brain-like in-pixel intelligent processing system to the in-pixel processing array to improve the object detection and identification.

16. The method according to claim 14, wherein each of the in-pixel processing units comprises:
   the photogate sensor, wherein the photogate sensor captures a pixel of the image of the object and produces an $I_{out}$ current to the in-pixel processing array;
   the average circuit, wherein the average circuit receives and averages $I_{out}$ current from the in-pixel processing unit and the plurality of neighboring in-pixel processing units through a plurality of input channels, and the averaged $I_{out}$ current from the plurality of neighboring in-pixel processing units is used as saccadic eye movements to generate the periphery (P) element;
   the subtraction circuit, wherein the periphery (P) element generated is used by the subtraction circuit to generate a fovea (F) element of the in-pixel processing unit; and
   the absolute circuit, wherein F element generated in pixel level is sent to the absolute circuit via pixel mapping to generate lateral *geniculate* nucleus (LGN) element of the in-pixel processing unit.

17. The method according to claim 14, wherein the P element, the F element of the in-pixel processing unit, are parallelly delivered in an array form through a periphery sub-window array and a fovea sub-window array.

18. The method according to claim 14, wherein the plurality of neighboring in-pixel processing units comprises: a first neighboring in-pixel processing unit, a second neighboring in-pixel processing unit, a third neighboring in-pixel processing unit, . . . , and a (Q−1)th neighboring in-pixel processing unit.

19. The method according to claim 18, wherein the plurality of in-pixel processing units comprises: N columns, and M rows of in-pixel processing unit, where N is a positive integer, and M is a positive integer, and the plurality of neighboring in-pixel processing units is selected according to saccadic eye movements, and centered at the in-pixel processing unit in a form of sub-window array.

20. The method according to claim 19, wherein the plurality of input channels of the in-pixel processing unit comprises: a first input channel from the in-pixel processing unit, a second input channel from the first neighboring in-pixel processing unit, a third input channel from the second neighboring in-pixel processing unit, . . . , and a Q-th input channel from the (Q−1)-th neighboring in-pixel processing unit.

* * * * *